United States Patent [19]

Nojima et al.

[11] Patent Number: 5,054,422
[45] Date of Patent: Oct. 8, 1991

[54] MULTI-LAYERED GASEOUS PHASE CULTIVATION

[75] Inventors: Hisatake Nojima; Youko Nojima, both of Chiba, Japan

[73] Assignee: Yuugen-Kaisha Parasight, Chiba, Japan

[21] Appl. No.: 381,412

[22] PCT Filed: Sep. 12, 1988

[86] PCT No.: PCT/JP88/00925
§ 371 Date: Jul. 12, 1989
§ 102(e) Date: Jul. 12, 1989

[87] PCT Pub. No.: WO89/02218
PCT Pub. Date: Mar. 23, 1989

[51] Int. Cl.[5] .............................................. A01K 63/04
[52] U.S. Cl. ..................................... 119/3; 261/121.2; 261/123
[58] Field of Search ............... 119/3; 210/220; 261/94, 261/121.2, 123, 126

[56] References Cited

U.S. PATENT DOCUMENTS

| 362,234 | 5/1887 | Stauber | 261/123 |
| 2,824,728 | 2/1958 | Crawford | 261/121.2 X |

FOREIGN PATENT DOCUMENTS

| 2253919 | 5/1974 | Fed. Rep. of Germany | 261/123 |
| 4426634 | 11/1969 | Japan. | |
| 18208 | of 1896 | United Kingdom | 261/123 |

Primary Examiner—Robert P. Swiatek
Attorney, Agent, or Firm—Fleit, Jacobson, Cohn, Price, Holman & Stern

[57] ABSTRACT

The present invention comprises tray-like shallow vats placed upside down and horizontally at intervals in a culture tank so as to provide partitioned air spaces in mid water. When gas is sent, via an air supply pipe, into an air space provided at the bottom vat, a good number of artificial environments, in contact with an atmospheric environment in a manner similar to the natural surface of the water, are efficiently provided in the culture tank.

2 Claims, 2 Drawing Sheets

MULTI-LAYERED GASEOUS PHASE CULTIVATION

BACKGROUND OF THE INVENTION

1. Field of the Invention

The present invention achieves the development of a method of mass culture of various aquatic organisms. The present invention also relates to a method of culturing aerobic or anaerobic organisms, as well as chemosynthetic bacteria, in a large scale by supplying and accumulating air, oxygen, nitrogen or any other desired gases, in a desired amount and at a desired location, in a culture system. Thus, the present invention relates to a method of mass culture of fish, shellfish, animal cells, plant cells or microorganisms for application in biotechnology.

2. Description of the Prior Art

In conventional methods for culturing aquatic organisms, such as fish, violent aeration, using water-wheel-like machines or aerators, is applied so as to dissolve atmospheric oxygen into relatively shallow cultivation tanks or ponds. If deeper tanks or ponds are introduced for the purpose of mass culture, the oxygen concentration in the water tends to be insufficient for the growth of the organisms, which results in lower production efficiency. However, the use of shallow and large tanks or ponds decreases land utility efficiency and also aggravates the difficulty in collecting and removing feed debris and excretions, which sometimes results in environmental deterioration of the tanks and ponds. Furthermore, in conventional methods for culturing plant or animal cells or microorganisms on a large scale, the cells or microorganisms in the culture tanks are vitally damaged by aeration devices, such as water-wheel-like machines rotating violently to supply atmospheric oxygen into water.

SUMMARY OF THE INVENTION

The present invention has achieved the development of a method for culturing various aquatic organisms in water with sufficient oxygen supply by placing several tray-like shallow vats upside down horizontally at intervals in water in a culture tank so as to provide air spaces partitioned in mid water. Atmospheric air or oxygen introduced in each air space, for example, thus raises the oxygen concentration in the water under the spaces.

The present invention relates to providing multiple layers of desired gases in water, which are useful in helping the reserved, or stored gases to dissolve in water. Furthermore, by placing the vats upside down and horizontally to reserve gas, each surface of the partition of the vats functions as a culture bed or shelf having a very near gaseous phase.

By using a tube provided in each vat which functions as an air escape hole and supplying gas via an air supplying pipe, the present invention achieves the control of gas phases in water.

The scientific background of the present invention pertains to the relation between physical phenomenon of gas-liquid and biological respiration of aquatic organisms. As more air contacts with culture water having such organisms, more oxygen will dissolve in the water, and more carbon dioxide will be released from the water. The present invention provides many chances for the physical phenomenon of forming multiple air layers. Being supplied by an air supplying pipe, the air layers provide a plurality of artificial surfaces of water in addition to the natural surface of water in the culture tank.

DETAILED DESCRIPTION OF THE PREFERRED EMBODIMENTS

Figure 1:
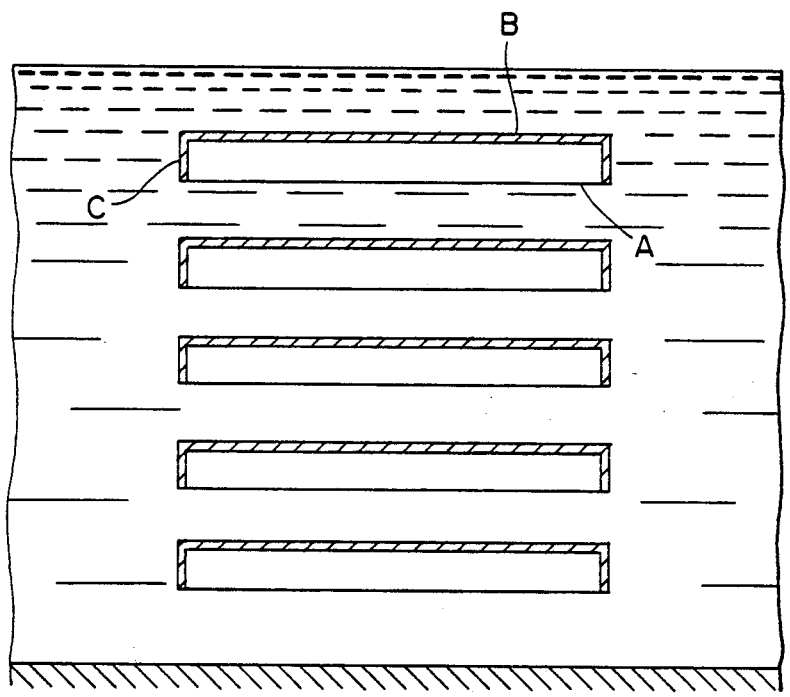
FIG. 1 is a schematic front view of upside down stacked vats according to a first embodiment of the device.
Figure 3:
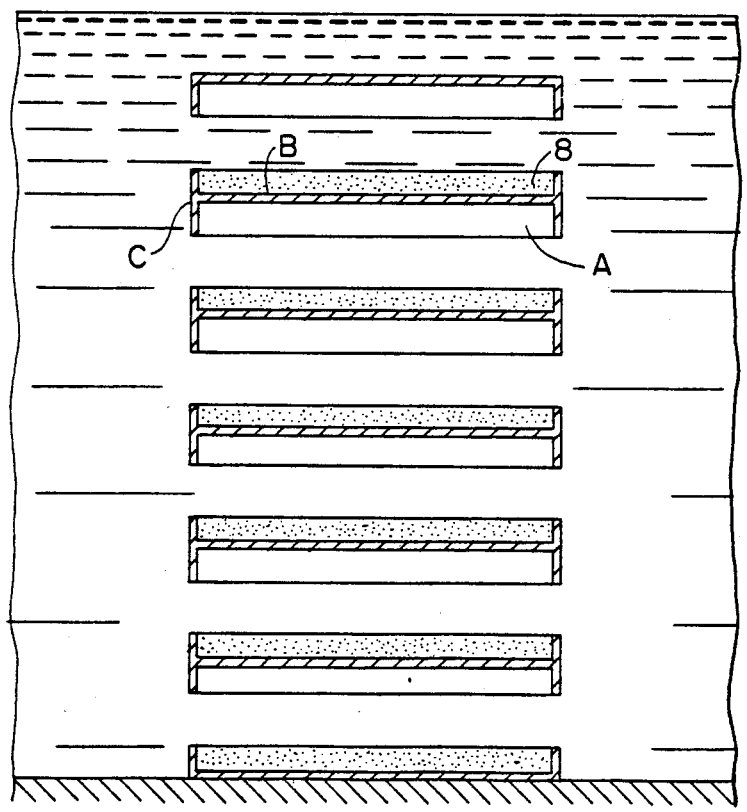
FIG. 3 is a schematic, front view of another embodiment of the device.
Figure 2:
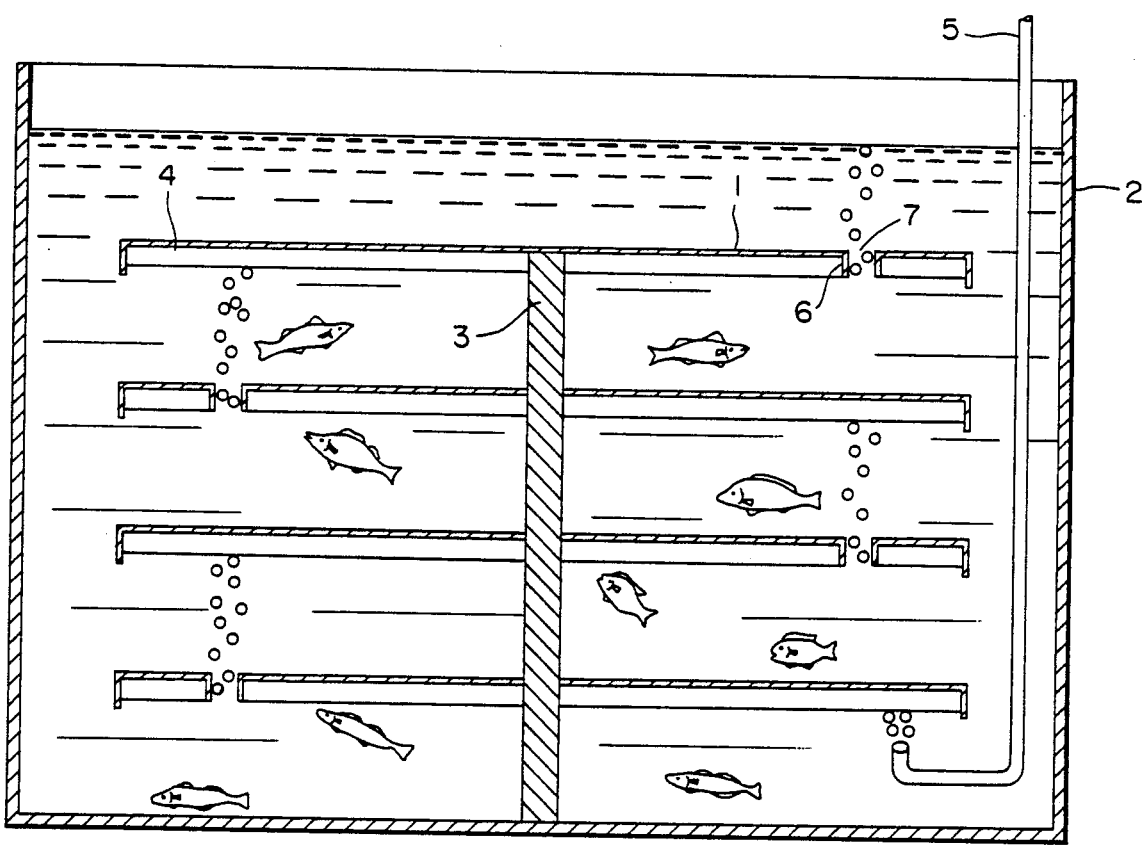
FIG. 2 is a more detailed view of tray-like shallow vats according to a second embodiment of the device.

FIG. 1 is, as noted above, a front view of upside down stacked vats, wherein reference characters A, B and C correspond to a gas phase, a bottom of the container, and a partition, respectively. Furthermore, gas supplying tubes may also be equipped to replace air by any desired gases. Referring to FIG. 2, one or more of tray-like shallow vats (1) are placed upside down, mid water, in a culture tank (2). The vats are stacked, with a support (3) supporting the vats at desired space intervals. When the gas is sent, via an air supply pipe (5), into the air space (4) of the vat (1) at the bottom of the culture tank (1), the gas is reserved in the space, down to the lowest end of the tube (6), which is designed to be shorter than the depth of the vat (1). The gas flows out and escapes upward from an air escape hole (7). Similarly, the air spaces of upper vats (1) reserve and release the gas continuously, except that the gas is sent to each of these upper vats from the air escape holes (7) in the vat immediately below rather than via the air supply pipe (5). As a consequence, the culture tank (2), thus equipped, provides an efficient system which comprises the liquid phase area on the surface of the partition for culturing desired aquatic organisms and the gas phase areas for reserving air or desired gases. Thus, many artificial water surfaces, in contact with an atmospheric environment, as is the natural surface of water, are efficiently provided in the culture tank. As illustrated in FIG. 3, grains of sand or fine gravel (8) are placed on the surface of the partition, i.e., each bottom surface of the vats (1). Thus the multiple layers of atmospheric environment are artificially formed in mid water.

According to the present invention, the problem of oxygen deficiency in water bodies is solved. This makes it possible to mass produce aquatic organisms.

We claim:

1. A multi-layered, gaseous phase cultivation method for culturing aquatic organisms in water, comprising the steps of:

disposing a plurality of tray-like shallow vats in a culture tank horizontally and upside down, each of said vats including a substantially horizontal flat portion, a substantially vertical perimeter wall at the perimeter of said flat portion, a hole, passing through said flat portion, and a tube surrounding and extending along a central axis of said hole;

providing a supporter to support said vats in a stack, certain intervals being provided between said vats in such a manner as to divide said culture tank into multiple spaces;

feeding air from the bottom of said culture tank to one of said vats, disposed in the lowermost portion of said culture tank, via an air supply pipe;

reserving said air in an air space in said one of said vats formed between said flat portion and said perimeter wall, said air space having a height which is a little lower than the height of the perimeter wall of said one of said vats; and bleeding the air stored in said air space gradually upward through each vat hole in successive vats to form an aerated air reserving space, adjacent a cultivation place for aquatic organisms, between each adjacent pair of the vats.

2. The multi-layered gaseous phase cultivation method according to claim 1, and further comprising the step of putting sand grains, fine gravel and the like on an open area provided on an upper surface of each horizontal flat portion so as to form each cultivation place for aquatic organisms.

* * * * *